United States Patent
Halang (10) Patent No.: US 10,604,193 B2
(45) Date of Patent: Mar. 31, 2020

(54) MOTOR VEHICLE

(71) Applicant: Bayerische Motoren Werke Aktiengesellschaft, Munich (DE)

(72) Inventor: Felix Halang, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 108 days.

(21) Appl. No.: 15/835,773

(22) Filed: Dec. 8, 2017

(65) Prior Publication Data

US 2018/0099701 A1    Apr. 12, 2018

Related U.S. Application Data

(63) Continuation of application No. PCT/EP2016/062610, filed on Jun. 3, 2016.

(30) Foreign Application Priority Data

Jun. 9, 2015 (DE) .................. 10 2015 210 485

(51) Int. Cl.
  *B62D 29/00* (2006.01)
  *B62D 25/00* (2006.01)
  (Continued)

(52) U.S. Cl.
  CPC ........... *B62D 29/002* (2013.01); *B62D 25/00* (2013.01); *B62D 25/14* (2013.01); *B62D 27/00* (2013.01)

(58) Field of Classification Search
  CPC ...... B62D 29/002; B62D 27/00; B62D 25/14; B62D 25/00
  (Continued)

(56) References Cited

U.S. PATENT DOCUMENTS 5,642,914 A * 7/1997 Takabatake .......... B62D 29/002
                                                    296/187.02
6,079,180 A    6/2000 Wycech
(Continued)

FOREIGN PATENT DOCUMENTS

CN    1646288 A    7/2005
CN    1693047 A    11/2005
(Continued)

OTHER PUBLICATIONS

Chinese-language Office Action issued in counterpart Chinese Application No. 201680032944.4 dated Mar. 5, 2019 with English translation (13 pages).
(Continued)

*Primary Examiner* — Jason S Morrow
*Assistant Examiner* — E Turner Hicks
(74) *Attorney, Agent, or Firm* — Crowell & Moring LLP (57) ABSTRACT

A motor vehicle is provided with a body which has hollow profiles with cavities formed therein. The cavities can be separated by bulkhead parts against water and noise. Each bulkhead part has a base support with an expandable foam part provided therewith. Under the influence of heat, the foam part foams from a determined temperature and fills a surrounding gap that is formed between an end face of the bulkhead part and an opposing inner surface of the hollow profile. The bulkhead part includes two longitudinal sections and a transverse part connecting the two longitudinal sections of the bulkhead part such that a surrounding framework of the base support is produced. The bulkhead part forms an essentially U-shaped receiving opening. A respective attachment element is formed on inner framework sections of the longitudinal sections and of the transverse part of the base support, so that, in the engaged state of the attachment elements, at least three mutually separated (Continued)

attachment points are produced in the through-openings of the body profile.

10 Claims, 7 Drawing Sheets

(51) Int. Cl.
  *B62D 25/14* (2006.01)
  *B62D 27/00* (2006.01)
(58) Field of Classification Search
  USPC .................................. 296/187.02, 203.01, 30
  See application file for complete search history.

(56) References Cited

U.S. PATENT DOCUMENTS

| | | | |
|---|---|---|---|
| 6,413,611 B1* | 7/2002 | Roberts | B62D 29/002 |
| | | | 296/193.06 |
| 6,649,243 B2 | 11/2003 | Roberts et al. | |
| 7,255,388 B2* | 8/2007 | Le Gall | B62D 29/002 |
| | | | 296/106 |
| 7,422,088 B2 | 9/2008 | Ito | |
| 7,455,350 B2* | 11/2008 | Bunte | B60R 13/08 |
| | | | 296/187.02 |
| 7,913,467 B2* | 3/2011 | Schneider | B62D 29/002 |
| | | | 296/187.02 |
| 8,087,916 B2* | 1/2012 | Kanie | B29C 44/18 |
| | | | 249/63 |
| 8,215,704 B2* | 7/2012 | Monnet | B62D 29/002 |
| | | | 296/187.02 |
| 8,758,535 B2* | 6/2014 | White | B62D 29/002 |
| | | | 156/293 |
| 8,911,008 B1* | 12/2014 | Campbell | B60J 7/0084 |
| | | | 296/187.02 |
| 8,920,900 B2* | 12/2014 | Nakayama | B29C 44/18 |
| | | | 428/99 |
| 8,967,327 B2* | 3/2015 | Synnestvedt | B65D 90/52 |
| | | | 181/284 |
| 9,415,811 B2* | 8/2016 | Schneider | B62D 29/001 |
| 2003/0194548 A1 | 10/2003 | Mcleod et al. | |
| 2004/0124666 A1* | 7/2004 | Stahl | B60N 2/015 |
| | | | 296/187.02 |
| 2005/0082111 A1* | 4/2005 | Weber | B60R 13/08 |
| | | | 181/204 |
| 2005/0249936 A1 | 11/2005 | Ui et al. | |
| 2007/0096491 A1 | 5/2007 | Sato | |

FOREIGN PATENT DOCUMENTS

| | | |
|---|---|---|
| CN | 1802276 A | 7/2006 |
| DE | 102 37 962 A1 | 3/2004 |
| GB | 2 418 246 A | 3/2006 |
| JP | 11-254571 A | 9/1999 |
| JP | 2001-341592 A | 12/2001 |
| JP | 2007-90999 A | 4/2007 |
| WO | WO 2005/037608 A1 | 4/2005 |

OTHER PUBLICATIONS

International Search Report (PCT/ISA/210) issued in PCT Application No. PCT/EP2016/062610 dated Sep. 13, 2016 with English translation (six pages).
German-language Written Opinion (PCT/ISA/237) issued in PCT Application No. PCT/EP2016/062610 dated Sep. 13, 2016 (six pages).
German-language Search Report issued in counterpart German Application No. 10 2015 210 485.0 dated May 12, 2016 with partial English translation (12 pages).

* cited by examiner

MOTOR VEHICLE

CROSS REFERENCE TO RELATED APPLICATIONS

This application is a continuation of PCT International Application No. PCT/EP2016/062610, filed Jun. 3, 2016, which claims priority under 35 U.S.C. § 119 from German Patent Application No. 10 2015 210 485.0, filed Jun. 9, 2015, the entire disclosures of which are herein expressly incorporated by reference.

BACKGROUND AND SUMMARY OF THE INVENTION

The invention relates to a motor vehicle with a body which has hollow profiles with cavities formed therein, wherein the cavities can be separated off from water and sound by bulkhead parts. A respective bulkhead part has a base support with an expandable foam part provided therewith, wherein the foam part foams under the influence of heat above a certain temperature and fills an encircling gap which is formed between an end surface of the bulkhead part and an opposite inner surface of the hollow profile. The bulkhead part has a fastening clip via which the bulkhead part is fastened to the body profile via a passage opening of the body profile.

DE 10237962 A1 discloses a partitioning component which is provided from a base support with a surrounding swelling foam. Furthermore, two clips, for example, are provided on the base support and are clipped in a body component. In the non foamed state of the foam part, there is an annular gap between the encircling end surfaces of the bulkhead part and the inner surfaces, which are opposite said end surfaces, of a body hollow profile.

Under the influence of heat, for example during painting of the body part, the foam part foams. The foamed foam forms a fixed connection to the opposite body parts. A water tight and/or sound insulating separation of the cavity concerned is thereby achieved.

It is the object of the invention to provide a device by which a cavity can be sealed in a water tight and/or sound insulating manner, with positionally fixed installation being ensured in a simple manner.

This object is achieved in that the bulkhead part has two longitudinal portions and a transverse part connecting the two longitudinal portions of the bulkhead part such that surrounding framework of the base support is produced. The bulkhead part forms a basically U-shaped receiving opening. At least one fastening element is formed in each case on the inner frame portions of the longitudinal portions and of the transverse part of the base support. Therefore, at least three fastening points (supporting points) which are spaced apart from one another are produced in the latched state of the fastening elements in the passage openings of the body profile.

A motor vehicle according to the invention has a body with hollow profiles in which cavities are formed. The cavities can be separated off from water and sound by bulkhead parts. The respective bulkhead part has a base support with an expandable foam part provided therewith. The foam part foams under the action of heat above a certain temperature and fills an encircling gap. The gap is formed between an end surface of the bulkhead part and an inner surface, which is opposite said end surface, of the respective hollow profile. The bulkhead part has a fastening clip via which the bulkhead part is fastened to the body profile via a passage opening of the body profile.

The bulkhead part is advantageously provided with two longitudinal portions and a transverse part connecting the two longitudinal portions of the bulkhead part such that surrounding framework of the base support is produced. The bulkhead part forms a basically U-shaped receiving opening. A fastening element is formed in each case on the inner frame portions of the longitudinal portions and on an inner frame portion of the transverse part of the base support, and therefore at least three fastening points, and hence supporting points, which are spaced apart from one another are produced in the latched state of the fastening element in the passage openings of the body profile.

In an advantageous embodiment, the surrounding framework of the base support has an upper portion and a lower portion. A lattice structure consisting of transverse webs and longitudinal webs is formed in the upper portion and in the lower portion.

The fastening elements are advantageously formed integrally on the inner frame portions of the surrounding framework.

In an advantageous embodiment, the base support is composed of a heat resistant plastic, such as PA 6.6.

The temperature T at which the foam part expands advantageously lies within a range of $150°\,C. \leq T \leq 220°\,C$.

In an advantageous embodiment, the encircling gap has a width of $3\,mm \leq t_{29} \leq 6\,mm$.

The fastening elements are advantageously clips and/or latching lugs.

In an advantageous embodiment, a plurality of passage openings for the arrangement of the corresponding number of fastening elements are formed in the body profile.

The passage openings formed in the body profile advantageously have, at least when latching lugs are used, a rectangular shape, the width b of which is $4\,mm \leq b \leq 8\,mm$ and the length l of which is $7\,mm \leq l \leq 10\,mm$.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
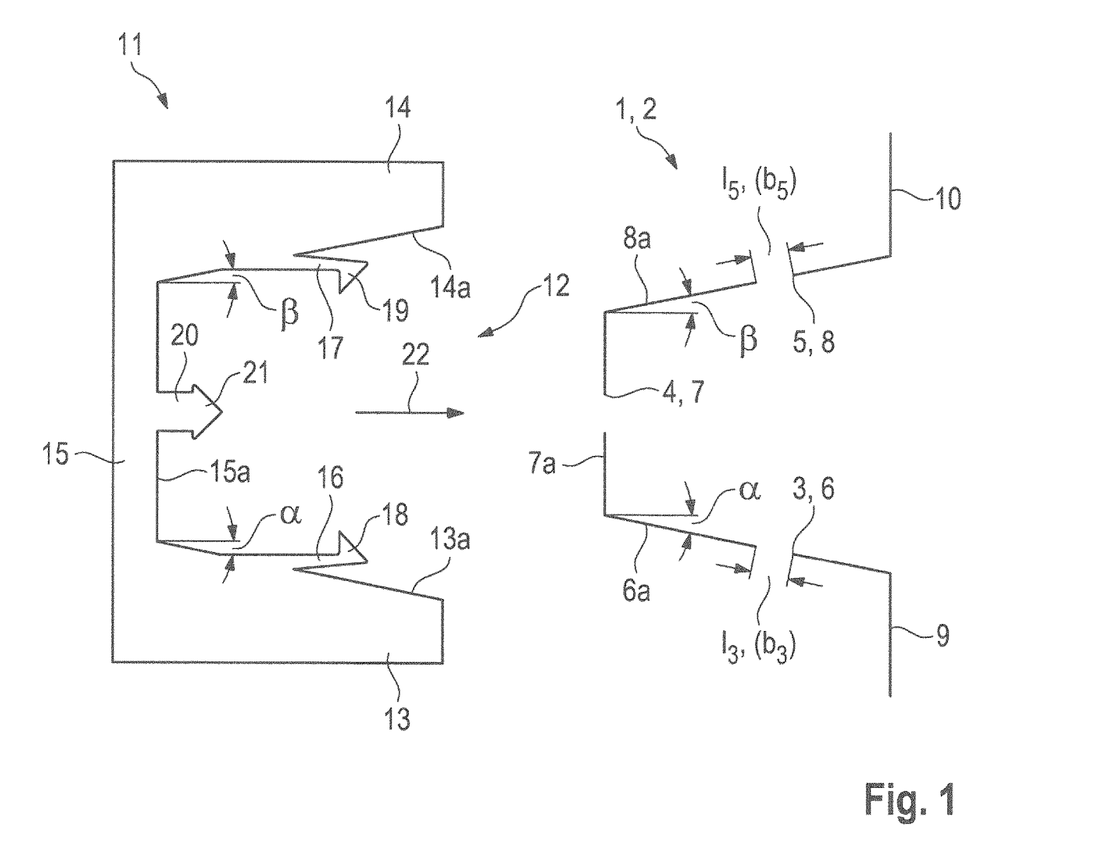
FIG. 1 is a schematic illustration of a partitioning component with three clips before fastening to a body component.

FIG. 1 shows a hat-shaped body profile 2 of a motor vehicle 1. The body profile 2 has three passage openings 3, 4 and 5 on profile portions 6, 7 and 8. The central profile portion 7 runs perpendicularly in FIG. 1 while the outer profile portions 6 and 8 which adjoin said central profile portion 7 extend obliquely upward in the direction of the vertically running flanges 9, 10.

A partitioning component 11 is illustrated spaced apart from the body profile 2 in FIG. 1. The partitioning component 11 is referred to as a bulkhead part for short below.

The bulkhead part 11 has a receiving opening 12 with two opposite, obliquely running sidewalls or longitudinal portions 13, 14 and a vertically running base portion or transverse portion 15 which connects the two sidewalls 13, 14 and runs vertically in FIG. 1.

In the embodiment shown, the sidewalls 13, 14 of the bulkhead part 11 have the respective same (pitch or inclination) angle α, β as the corresponding profile portions 6, 8 of the body profile 2.

In the embodiment which is shown in FIG. 1, a latching lug 16, 17 having in each case a hook-shaped end 18, 19 is in each case formed on the opposite side walls 13, 14 of the bulkhead part 11. A clip or a further latching lug 20 having a hook-shaped latching end 21 is provided on the base portion 15 of the bulkhead part 11. An arrow 22 shows the installation direction of the bulkhead part 11 in the direction of the body profile 2.

Figure 2:
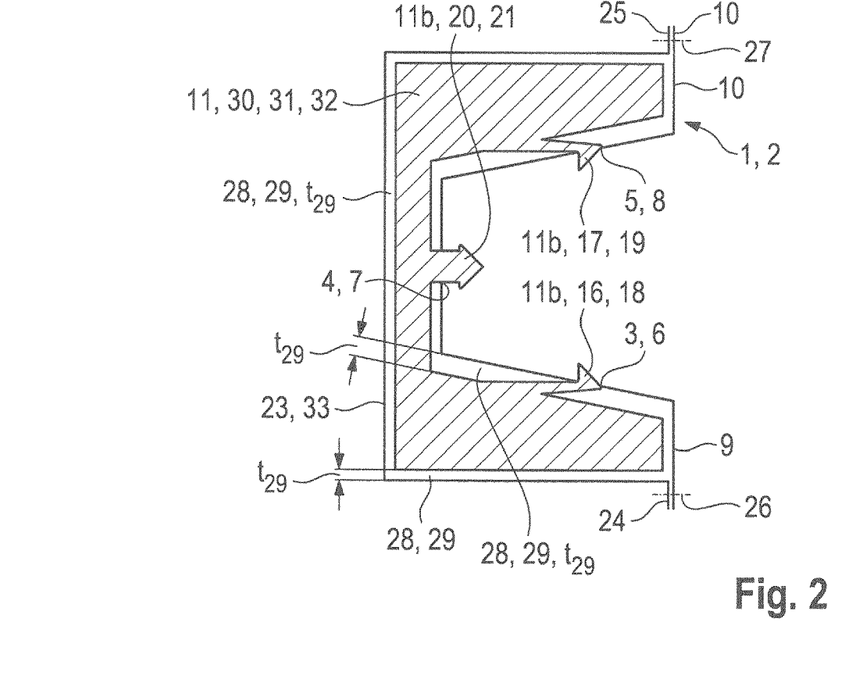
FIG. 2 is a schematic illustration corresponding to FIG. 1, wherein the partitioning component is fastened to the body component via the clips and a second body profile is connected to the first body profile, and therefore the partitioning component is located in a sealed cavity.

FIG. 2 shows the bulkhead part 11 in the state fastened to the body profile 2. The latching lugs 16, 17 and 20 are latched in the corresponding passage openings 3, 4 and 5 formed in the body profile 2.

In one embodiment, the passage openings 3 and 5 are designed as elongated holes having an approximately rectangular cross section. A length $l_3$ and $l_5$ is, for example, $l_3$, $l_5 \leq 10$ mm. A width $b_3$ and $b_5$ is, for example, $b_3$, $b_5 \leq 5$ mm. The passage opening 4 can be angular, for example square or rectangular, or round, for example rotationally symmetrical.

The bulkhead part 11 is surrounded by a substantially U-shaped body profile 23. The body profile 23 has flanges 24, 25 which are fastened to the flanges 9, 10 of the body profile 2 at fastening points 26, 27, for example via a welded joint. The body profile 2 and the body profile 23 which is spaced apart therefrom form a closed cavity 28.

In the cross-sectional view of FIG. 2, the bulkhead part 11 is arranged in the cavity 28 in such a manner that an encircling gap 29 is produced. The gap 29 has a width $t_{29}$ of, for example, 3 mm $\leq t_{29} \leq$ 6 mm.

Figure 9:
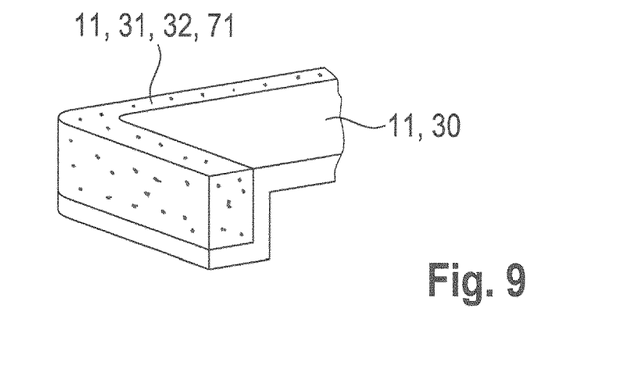
FIG. 9 is a perspective view of a corner region of the partitioning component shown in FIG. 8, from which the design of the base support and of a foam part arranged thereon is apparent.

As emerges from FIG. 9, the bulkhead part 11 has a base support 30 and a foam part 31 which is connected thereto and is expandable under the action of heat.

In FIG. 2, the foam part 31 is in the non expanded state 32. An anti rotation or anti tilt fastening of the bulkhead part 11 to the body profile 2 is produced via the latching lugs 16, 17, 20 which are clipped in the passage openings 3, 4, 5 of the body profile 2.

Figure 3:
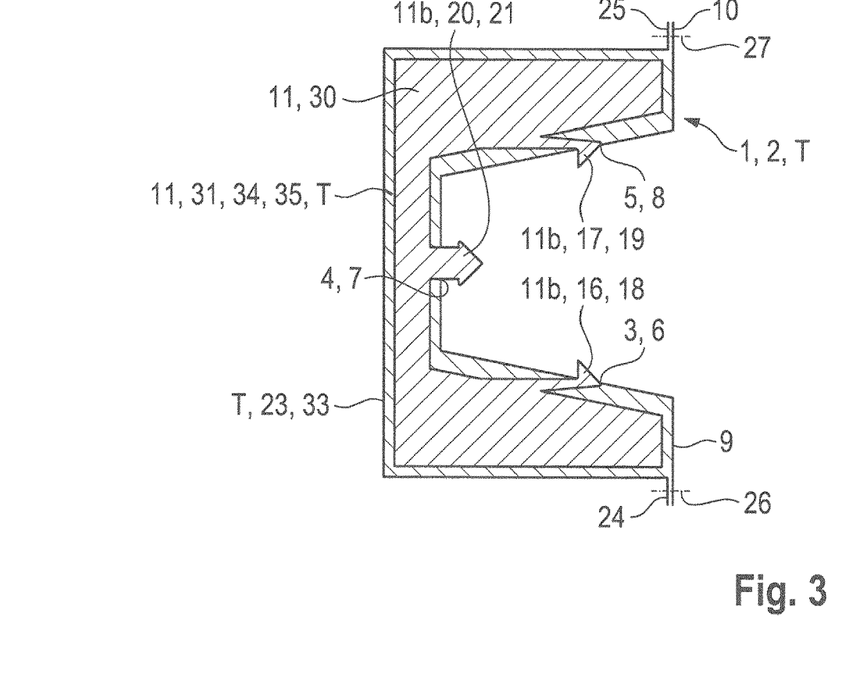
FIG. 3 is a schematic illustration corresponding to FIG. 2 after action of heat, in which a foam part of the partitioning component has foamed and seals an annular gap for sealing in relation to water and/or sound.

In FIG. 3, the hollow profile 33 consisting of the body profiles 2 and 23 has been heated at a temperature T, for example during the painting operation. By means of the heating, the foam part 31 has expended or foamed in such a manner that the gap 29 has been filled by the foam 34 of the foam part 31.

In this expanded state 35 of the foam part 31, sealing of the cavity 28 of the hollow profile 33 against liquids, such as water or the like, and/or sound damping or sound absorption takes place via the foamed foam of the bulkhead part 11.

Figure 4:
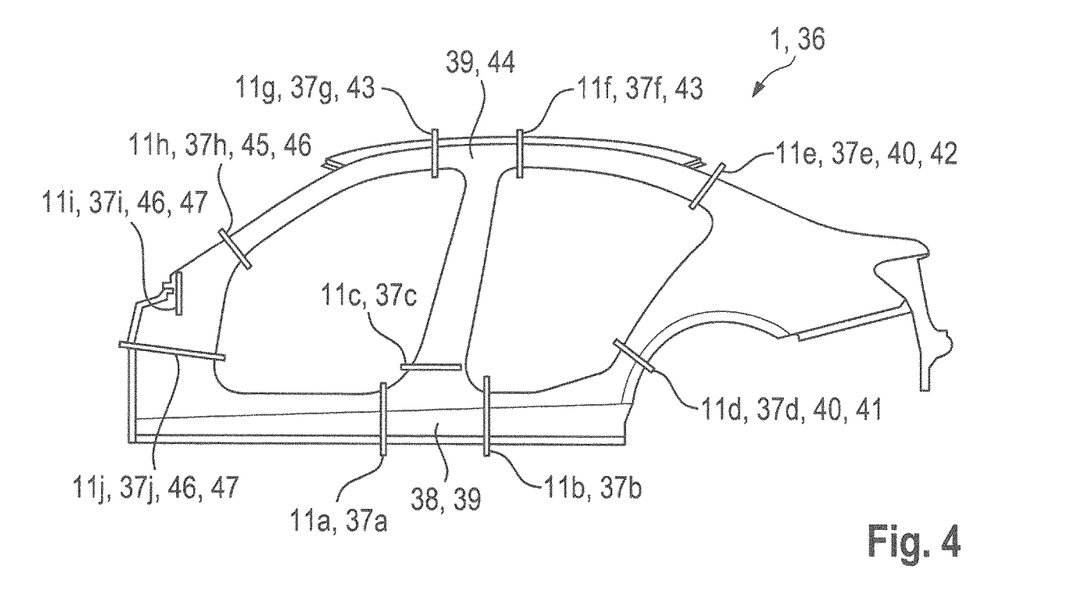
FIG. 4 is a side view of a motor vehicle at which nine sealing points in cavities of the body are shown.

FIG. 4 shows a side frame 36 of a motor vehicle 1. In one embodiment, bulkhead parts 11*a* to 11*j* are provided at nine relevant points 37*a* to 37*j*.

The bulkhead parts 11*a* to 11*c* are provided level with a lower end 38 of a B body pillar 39. The bulkhead 11*d* is arranged, for example, in a lower region of a C body pillar 40. The bulkhead part 11*e* is located at an upper end 41 of the C body pillar 40. The bulkhead parts 11*f* and 11*g* are arranged in a roof frame 43 at an upper end 44 of the B body pillar 39.

The bulkhead part 11*h* is fastened to a central portion 45 of an A body pillar 46. Two further bulkhead parts 11*i* and 11*j* are provided in a lower region 47 of the A body pillar 46 below a windshield (not illustrated) and in the region of a door (not illustrated). Further bulkhead parts can be provided at relevant points in the front structure, in the rear structure and in the floor assembly.

Figure 5:
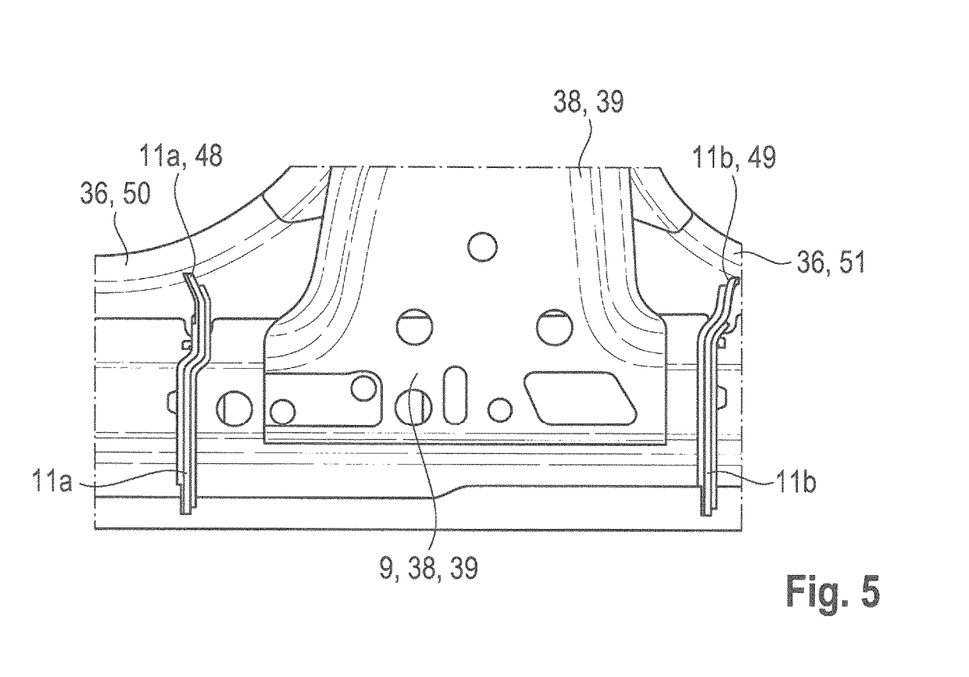
FIG. 5 is a perspective illustration of an arrangement of two partitioning components in a sill, wherein the foot of a B body pillar is located between the two partitioning components.

FIG. 5 shows an enlarged illustration of the lower end 38 of the B body pillar 9. The two bulkhead parts 11*a* and 11*b* are fastened to the sill side body profile 2. A respective upper end 48 and 49 of the respective bulkhead part 11*a* and 11*b* is arranged adjacent to in each case an inner sill profile 50, 51 of the side frame 36, forming the gap 29.

Figure 6:
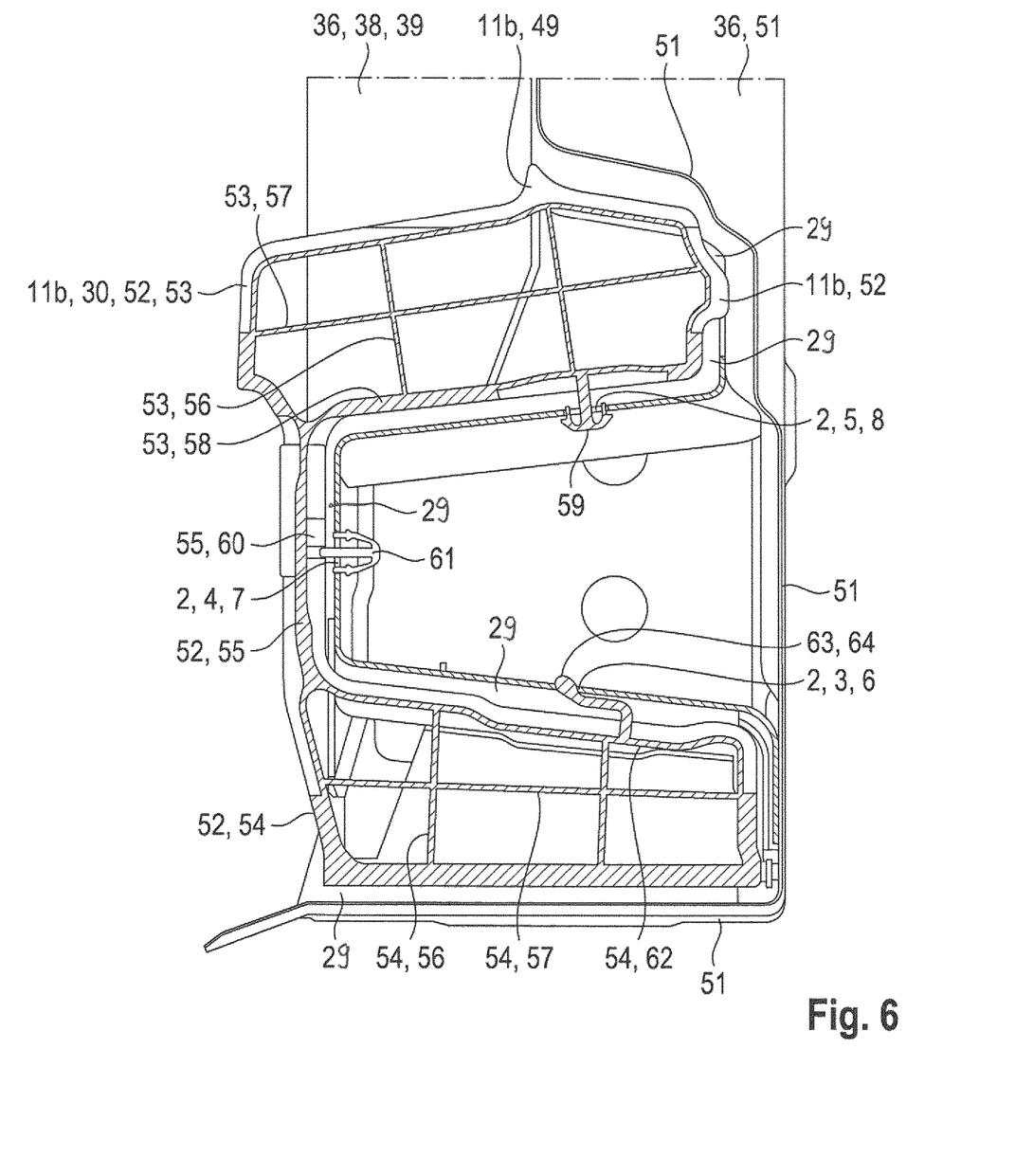
FIG. 6 is a sectional view through a partitioning component which is arranged on a sill inner profile, wherein, in FIG. 6, the structure of a base support of the partitioning component is illustrated and the foam part surrounding the base support has been omitted.

FIG. 6 shows a sectional view through the partitioning component or bulkhead part 11*b* in FIG. 5, from which the base support 30 of the bulkhead part 11*b* is apparent. The base support 30 of the bulkhead part 11*b* has surrounding framework 52. The frame 52 is divided into an upper and into a lower approximately rectangular portion 53, 54 and into a web 55 connecting the two portions 53, 54.

In order to reinforce the upper portion 53 and the lower portion 54, transverse and longitudinal webs 56 and 57 arranged in the form of a lattice are formed in the portions 53, 54. The upper portion 53 has an inner frame portion 58 on which a cross sectionally mushroom-shaped clip 59 is formed.

A cross sectionally mushroom-shaped clip 61 is likewise formed on the web 55 on an inner frame portion 60. A latching lug 64 provided with a hook 63 is formed integrally on the lower portion 54 on an inner frame portion 62. The clips 59, 61 and the hook 63 of the latching lug 64 are latched in the passage openings 5, 4, 3 in the profile portions 8, 7, 6 of the body profile 2.

Furthermore, the encircling gap 29 between the sill profile 51, the hat shaped body profile 2 connected to the latter and the frame 52, which lies opposite the body profile 2, of the bulkhead part 11*b* can be seen in FIG. 6.

Figure 7:
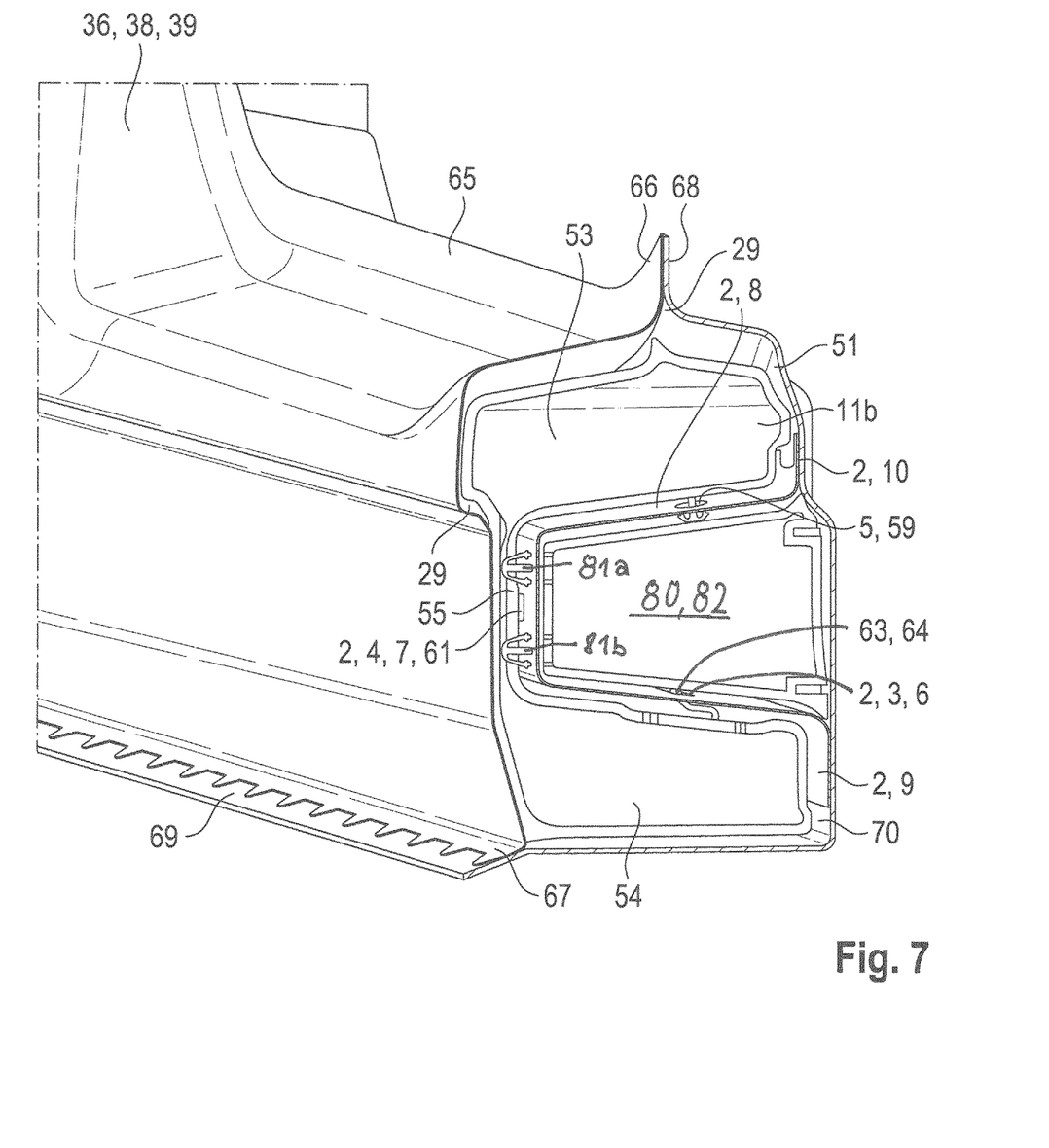
FIG. 7 is a perspective view which shows the partitioning component shown in FIG. 6, wherein, in FIG. 7, an outer profile is fastened to the inner profile, and therefore the partitioning component is located in a closed cavity.

In the perspective illustration of FIG. 7, four fastening points are provided in one embodiment. A fastening element in the form of a clip 59 is formed in the longitudinal portion or the sidewall 53 of the base support 30 of the bulkhead part 11*b*, and a fastening element in the form of a hook 63 with a latching lug 64 is formed in the longitudinal portion or the sidewall 54 of the bulkhead part 11*b*.

The fastening element shown in FIG. 6 in the form of a clip 61 is not illustrated in the web or transverse part 55 of the base support 30 of the bulkhead part 11*b*, said web or transverse part connecting the two longitudinal portions or the two sidewalls 54 of the bulkhead part 11*b*. Instead, two clips 81*a* and 81*b* of a further bulkhead part 80 can be seen, which clips are fastened to the hat shaped body profile 2. The bulkhead part 80 seals off the cavity 82 of the hat shaped body profile 2.

As an addition to the illustration of FIG. 6, an outer sill profile 65 is provided in FIG. 7. The outer sill profile 65 is connected via flanges 66, 67 to flanges 68, 69 of the inner sill profile 51, forming a cavity 70. In the cavity 70, the bulkhead part 11*b* is arranged in a positionally fixed manner on the body profile 2 via the fastening elements 59, 61, 64, forming the gap 29 with respect to the surrounding profiles 2, 51, 65.

Figure 8:
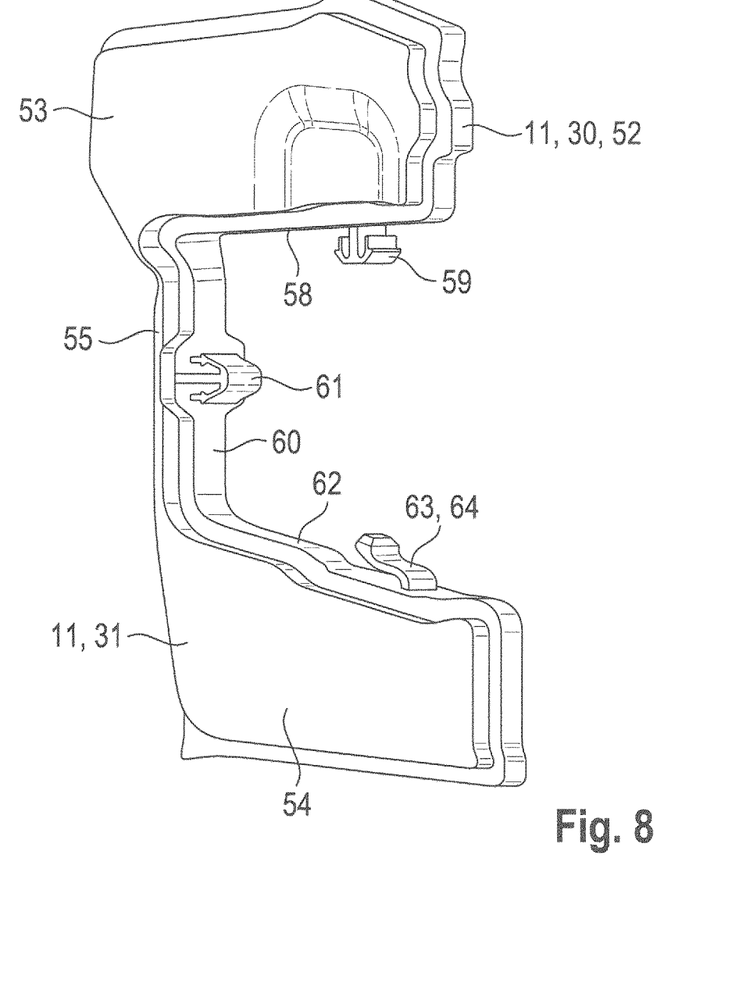
FIG. 8 is a perspective view of the partitioning component shown in FIGS. 5 to 7, wherein, in FIG. 8, the design and arrangement of three clips is apparent.
Figure 10:
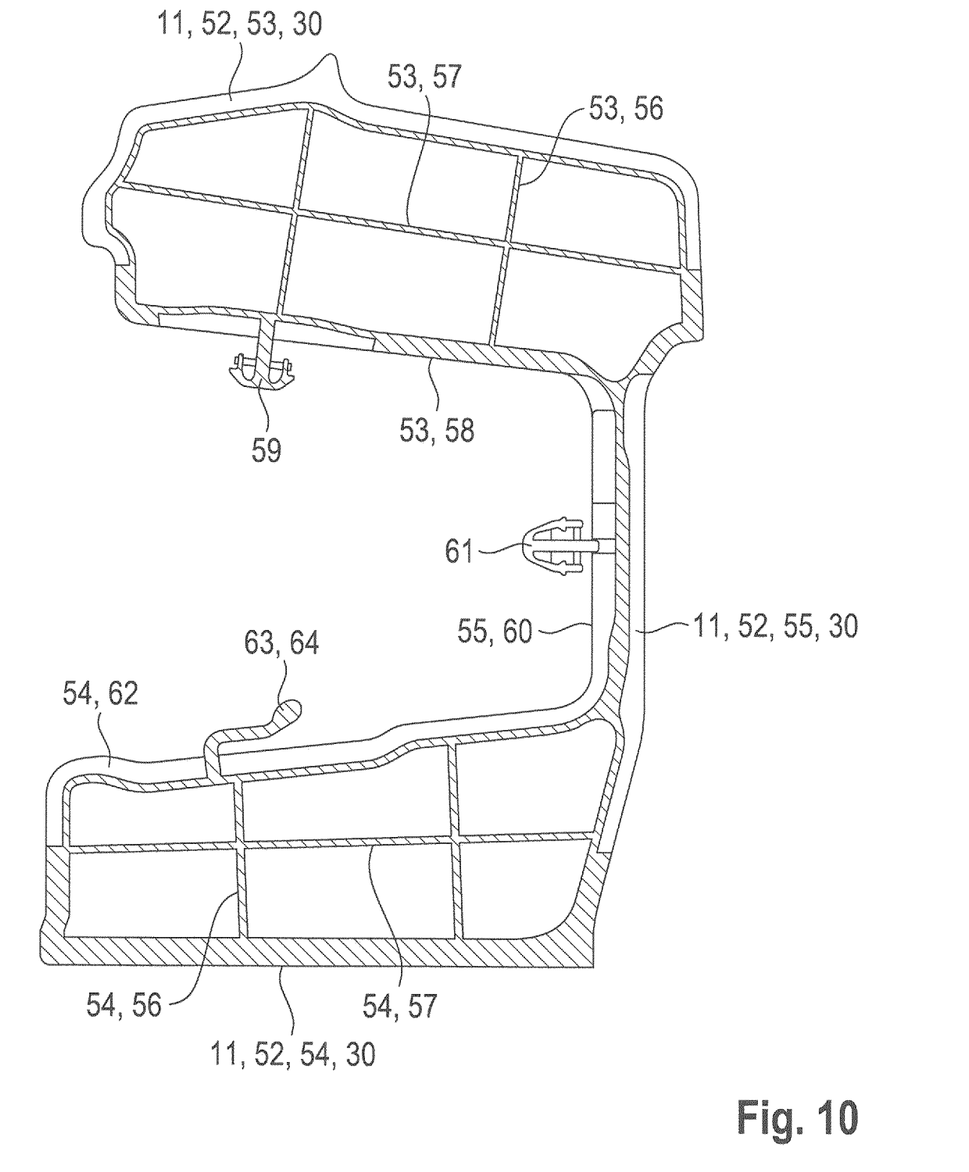
FIG. 10 is a view of the structure of the base support of the partitioning component shown in FIG. 8.

FIGS. 8 and 10 show the bulkhead part 11. FIG. 8 shows a side of the bulkhead part 11, on which the expandable foam part 31 is illustrated. Furthermore, the fastening elements 59, 61, 64 of the bulkhead part 11 are illustrated in FIG. 8.

FIG. 9 shows an edge portion 71 of the bulkhead part 11, from which the two part construction of the bulkhead part 11 from a base support 30 and an expandable foam part 31 is revealed. In FIG. 9, the expandable foam part 31 is illustrated in the non expanded state 32.

FIG. 10 shows a side view of the bulkhead part 11, as has already been substantially shown in FIG. 6. It is apparent from FIG. 10 that the base support 30 has the upper portion 53, the lower portion 54 and the web 55 connecting the two portions 53, 54. Furthermore, the fastening elements 59, 61 and 64 on the frame portions 58, 60 and 62 can be seen.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle with a body having hollow profiles with cavities formed therein, comprising:

at least one bulkhead part configured to separate a cavity from water and sound, the bulkhead part having a base support with an expandable foam part, wherein the foam part foams under action of heat above a certain temperature and fills an encircling gap between an end surface of the bulkhead part and an opposite inner surface of a respective hollow body profile, wherein the bulkhead part has two longitudinal portions and a transverse part connecting the two longitudinal portions producing surrounding framework of the base support, the bulkhead part has a U-shaped receiving opening, at least one fastening element is formed in each case on inner frame portions of the two longitudinal portions and of the transverse part, whereby at least three fastening points, which are spaced apart from one another, are produced in a latched state of the fastening elements in passage openings of the body profile.

2. The motor vehicle as claimed in claim 1, wherein
the surrounding framework of the base support has an upper portion and a lower portion, and
a lattice structure composed of transverse webs and longitudinal webs is formed in the upper portion and in the lower portion.

3. The motor vehicle as claimed in claim 1, wherein
the fastening elements are formed integrally on the inner frame portions of the surrounding framework.

4. The motor vehicle as claimed in claim 2, wherein
the fastening elements are formed integrally on the inner frame portions of the surrounding framework.

5. The motor vehicle as claimed in claim 1, wherein
the base support is composed of a heat resistant plastic.

6. The motor vehicle as claimed in claim 5, wherein
the heat resistant plastic is PA6.6.

7. The motor vehicle as claimed in claim 1, wherein
a temperature T at which the foam part expands lies within a range of $150° \text{C.} \leq T \leq 220° \text{C.}$ 8. The motor vehicle as claimed in claim 1, wherein
the encircling gap has a width of $3 \text{ mm} \leq t_{29} \leq 6 \text{ mm}$.

9. The motor vehicle as claimed in claim 1, wherein
the fastening elements are clips and/or latching lugs.

10. The motor vehicle as claimed in claim 1, wherein
the passage openings formed in the body have, at least when latching lugs are used, a rectangular shape, a width b of which is $4 \text{ mm} \leq b \leq 8 \text{ mm}$ and a length l of which is $7 \text{ mm} \leq l \leq 10 \text{ mm}$.

* * * * *